(12) United States Patent
Reed et al.

(10) Patent No.: US 12,134,115 B2
(45) Date of Patent: Nov. 5, 2024

(54) DRAIN CLEANING MACHINE

(71) Applicant: MILWAUKEE ELECTRIC TOOL CORPORATION, Brookfield, WI (US)

(72) Inventors: Michael C. Reed, Milwaukee, WI (US); Joshua P. Heimann, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 750 days.

(21) Appl. No.: 17/174,989

(22) Filed: Feb. 12, 2021

(65) Prior Publication Data
US 2021/0245208 A1 Aug. 12, 2021

Related U.S. Application Data

(60) Provisional application No. 62/975,320, filed on Feb. 12, 2020.

(51) Int. Cl.
*B08B 9/045* (2006.01)
*E03F 9/00* (2006.01)
*F16H 37/04* (2006.01)

(52) U.S. Cl.
CPC .............. *B08B 9/045* (2013.01); *E03F 9/005* (2013.01); *B08B 2209/04* (2013.01); *F16H 37/041* (2013.01); *F16H 2702/02* (2013.01)

(58) Field of Classification Search
CPC ........... B08B 9/045; B08B 9/047; E03F 9/005
(Continued)

(56) References Cited

U.S. PATENT DOCUMENTS 2,266,659 A 12/1941 Robinson et al.
2,628,380 A * 2/1953 Therrien ................. E03F 9/002
15/104.19
(Continued)

FOREIGN PATENT DOCUMENTS

CN 2179795 Y 10/1994
CN 1300897 A 6/2001
(Continued)

OTHER PUBLICATIONS

Ridgid Tools, "Ridgid K-60 Sectional Drain Cleaner," <https://www.youtube.com/watch?v=_HsRvo1zW8> video publicly available at least as early as Jul. 14, 2009.
(Continued)

*Primary Examiner* — Laura C Guidotti
(74) *Attorney, Agent, or Firm* — Michael Best & Friedrich LLP

(57) ABSTRACT

A drain cleaning machine includes a snake inlet tube, a clamping mechanism having a first support member and a second support member. The second support member is movable between a first position in which a first distance is defined between the first support member and the second support member, and a second position in which a second distance is defined between the first support member and the second support member. The clamping mechanism also includes a plurality of collets supported by the first and second support members. The drain cleaning machine also includes a motor switchable between a deactivated state and an activated state in which the motor is configured to rotate the clamping mechanism and an actuating lever moveable between a deactivated position, in which the second support member is in the first position, and an activated position, in which the second support member is in the second position.

28 Claims, 10 Drawing Sheets

(58) Field of Classification Search
USPC .......................................... 15/104.31, 104.33
See application file for complete search history.

(56) References Cited

U.S. PATENT DOCUMENTS

| | | | |
|---|---|---|---|
| 2,705,642 A | 4/1955 | Chasar | |
| 2,940,099 A * | 6/1960 | Kollmann | E03F 9/005 |
| | | | 279/57 |
| 2,955,307 A | 10/1960 | Hunt | |
| 3,075,218 A | 1/1963 | Kollmann | |
| 3,213,473 A | 10/1965 | Singer | |
| 4,361,924 A | 12/1982 | Irwin | |
| 4,447,926 A | 5/1984 | Rothenberger | |
| 4,556,352 A | 12/1985 | Resnicow | |
| 4,763,374 A | 8/1988 | Kaye | |
| 5,414,888 A | 5/1995 | Irwin | |
| 5,603,136 A | 2/1997 | Truschler | |
| 5,649,613 A | 7/1997 | Truschler | |
| 5,657,505 A | 8/1997 | Gallagher et al. | |
| 5,909,911 A | 6/1999 | Long | |
| 6,076,219 A | 6/2000 | Irwin | |
| 6,240,614 B1 | 6/2001 | Kojima et al. | |
| 6,546,582 B2 | 4/2003 | Silverman | |
| 6,655,228 B1 * | 12/2003 | Margherio | E03F 9/005 |
| | | | 74/424.77 |
| 6,742,415 B2 | 6/2004 | Scott | |
| 8,087,138 B2 | 1/2012 | Gupta | |
| 8,169,170 B2 | 5/2012 | Yasohara et al. | |
| 8,413,347 B2 | 4/2013 | Gress et al. | |
| 8,696,286 B1 | 4/2014 | Martin | |
| 9,021,673 B2 | 5/2015 | Ray | |
| 9,157,320 B2 | 10/2015 | Lehnert et al. | |
| 9,884,353 B2 * | 2/2018 | Banholzer | E03F 9/005 |
| 10,166,665 B2 | 1/2019 | Szymusiak et al. | |
| 10,272,480 B2 | 4/2019 | Zink et al. | |
| 10,889,976 B2 | 1/2021 | Skrjanc et al. | |
| 2009/0211044 A1 | 8/2009 | Hale et al. | |
| 2009/0235510 A1 | 9/2009 | Gupta | |
| 2013/0319190 A1 | 12/2013 | Nino et al. | |
| 2014/0106889 A1 | 4/2014 | Cheng | |
| 2015/0105163 A1 * | 4/2015 | Rutkowski | F16D 1/108 |
| | | | 464/110 |
| 2015/0150635 A1 | 6/2015 | Kilroy et al. | |
| 2015/0321326 A1 | 11/2015 | Nino et al. | |
| 2016/0245441 A1 | 8/2016 | Klein et al. | |
| 2018/0030714 A1 | 2/2018 | Miller et al. | |
| 2018/0030715 A1 | 2/2018 | Miller et al. | |
| 2018/0147713 A1 | 5/2018 | Schmauder et al. | |
| 2019/0162558 A1 | 5/2019 | Schmauder et al. | |
| 2019/0186551 A1 | 6/2019 | Skrjanc et al. | |
| 2019/0210077 A1 | 7/2019 | Zink et al. | |
| 2020/0048885 A1 | 2/2020 | Reed et al. | |
| 2020/0230789 A1 | 7/2020 | Dey, IV et al. | |
| 2021/0229140 A1 | 7/2021 | Rose et al. | |
| 2022/0298775 A1 | 9/2022 | Heimann | |

FOREIGN PATENT DOCUMENTS

| | | | | |
|---|---|---|---|---|
| CN | 201052511 Y | 4/2008 | | |
| CN | 201109080 Y | 9/2008 | | |
| CN | 101941188 A | 1/2011 | | |
| CN | 102036759 A | 4/2011 | | |
| CN | 203222865 U | 10/2013 | | |
| CN | 106903122 A | 6/2017 | | |
| DE | 1935805 U | 3/1966 | | |
| DE | 1942341 C3 | 9/1979 | | |
| DE | 2613944 C3 | 7/1981 | | |
| DE | 19739359 A1 | 5/1999 | | |
| DE | 102007027046 A1 | 12/2008 | | |
| DE | 102017109923 A1 | 11/2018 | | |
| EP | 0607612 B1 | 3/1997 | | |
| EP | 3476498 A1 | 5/2019 | | |
| JP | 2000042506 A | 2/2000 | | |
| KR | 100528285 B1 * | 11/2005 | ............. | B08B 9/045 |
| KR | 1020150115509 A | 10/2015 | | |
| KR | 1020160143309 A | 12/2016 | | |
| RU | 59453 U1 | 12/2006 | | |
| WO | 03010367 A1 | 2/2003 | | |
| WO | 2020215059 A1 | 10/2020 | | |

OTHER PUBLICATIONS

International Search Report and Written Opinion for Application No. PCT/US2021/017879 dated Jun. 8, 2021 (11 pages).

* cited by examiner

DRAIN CLEANING MACHINE

CROSS REFERENCE TO RELATED APPLICATION

This application claims the priority benefit of U.S. Provisional Patent Application Ser. No. 62/975,320, filed on Feb. 12, 2020, the entire contents of which are incorporated by reference herein.

BACKGROUND

The present invention relates to drain cleaning machines, and more particularly to sectional drain cleaning machines.

Drum-type and sectional drain cleaning machines are both used to feed a snake (e.g., a cable or spring) through a drain to clean the drain. Drum-type machines rotate a drum containing the snake to feed the snake into the drain. In sectional drain cleaning machines, the snake is not stored in the machine and is instead fed into the machine.

SUMMARY

The present invention provides, in one aspect, a drain cleaning machine including a snake inlet tube defining a snake axis, a clamping mechanism having a first support member with an inclined surface, and a second support member having an inclined surface. The second support member is movable along the snake axis between a first position in which a first distance is defined between the first support member and the second support member, and a second position in which a second distance is defined between the first support member and the second support member. The second distance is less than the first distance. The clamping mechanism also includes a plurality of collets supported by the first and second support members. Each of the plurality of collets have a first inclined surface engaged against the inclined surface of the first support member and a second inclined surface engaged against the inclined surface of the second support member. When the second support member is in the first position, each collet is in a disengaged position, and wherein in response to the second support member moving from the first position to the second position, each of the collets is moved from the disengaged position to an engaged position, in which each collet is closer to the snake axis than when in the disengaged position. The drain cleaning machine also includes a motor switchable between a deactivated state and an activated state in which the motor is configured to rotate the clamping mechanism about the snake axis and an actuating lever moveable between a deactivated position, in which the second support member is in the first position, and an activated position, in which the second support member is in the second position.

The present invention provides, in another aspect, a drain cleaning machine including a motor defining a motor axis and a snake inlet tube defining a snake axis. The snake inlet tube is configured to rotate about the snake axis. The drain cleaning machine also includes a transmission to transfer rotation from the motor to the snake inlet tube. The transmission includes an output shaft rotatably driven by the motor, a first gear coupled to the output shaft for co-rotation therewith, and a second gear coupled to the snake inlet tube for co-rotation therewith. The second gear is engaged with the first gear to receive rotation from the first gear.

The present invention provides, in another aspect, a drain cleaning machine including a first tube defining a snake axis, a second tube coaxial with the first tube, and a clamping mechanism supported by the first and second tubes. The clamping mechanism is configured to selectively engage a drain cleaning snake extending through the first and second tubes. The drain cleaning machine also includes a motor operable to selectively rotate the clamping mechanism about the snake axis, a switch coupled to the motor and operable to change the motor between a deactivated state and an activated state, a cam follower moveable between a deactivated position, in which the motor is not activated by the switch, and an activated position, in which the motor is activated by the switch, an actuating lever moveable between a first position, in which the clamping mechanism does not engage the drain cleaning snake, and a second position, in which the clamping mechanism engages the drain cleaning snake, and a pull rod including a first end coupled to the second tube and a second end coupled to the actuating lever. The second end defines a cam. In response to the actuating lever moving from the first position to the second position, the cam engages the cam follower to move the cam follower from the deactivated position to the activated position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
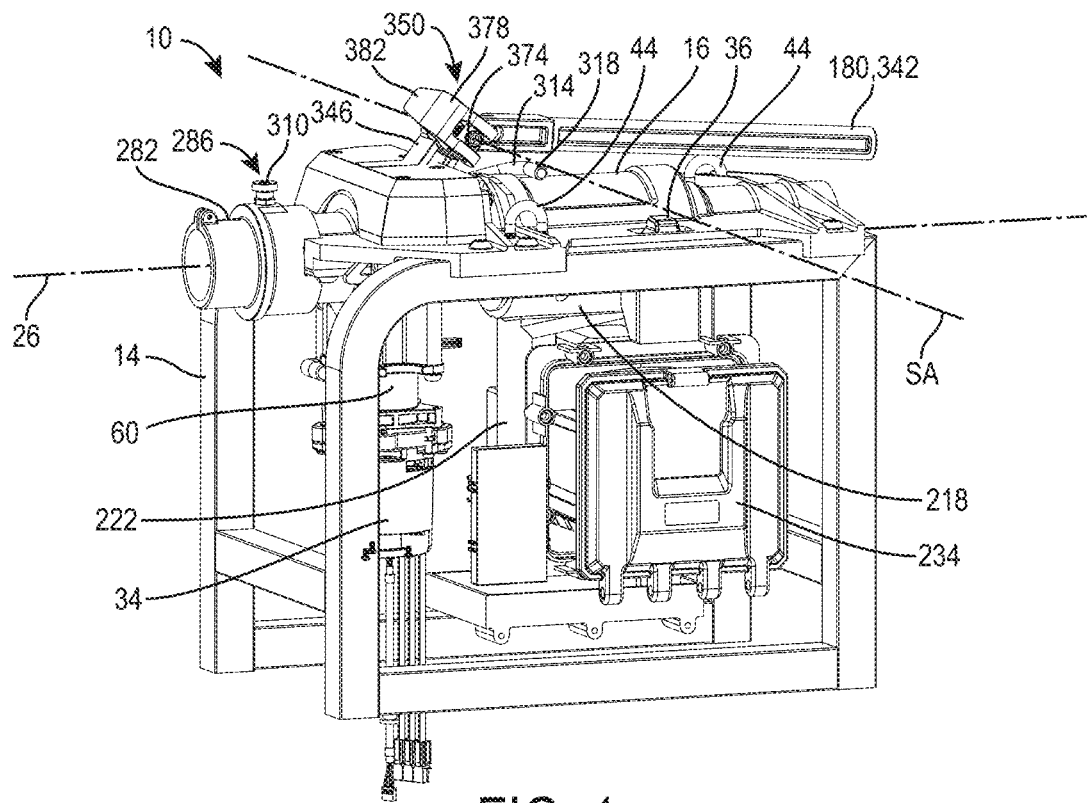
FIG. 1 is a perspective view of a drain cleaning machine.
Figure 2:
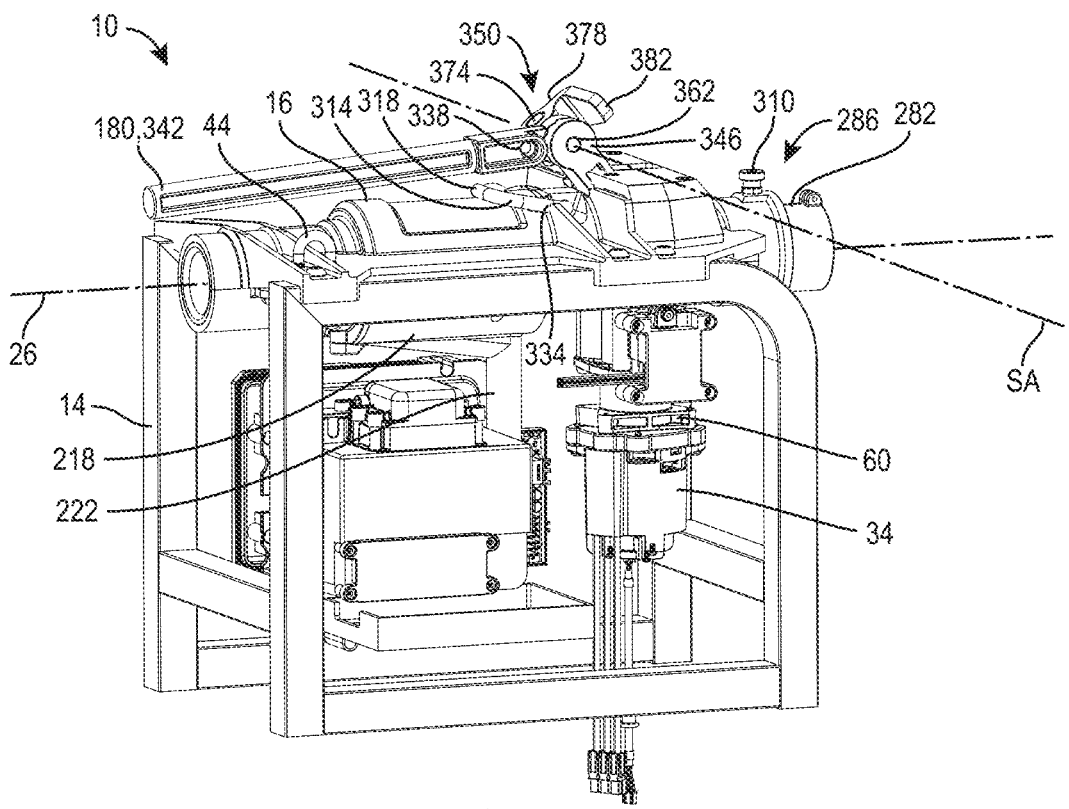
FIG. 2 is another perspective view of the drain cleaning machine of FIG. 1.
Figure 3:
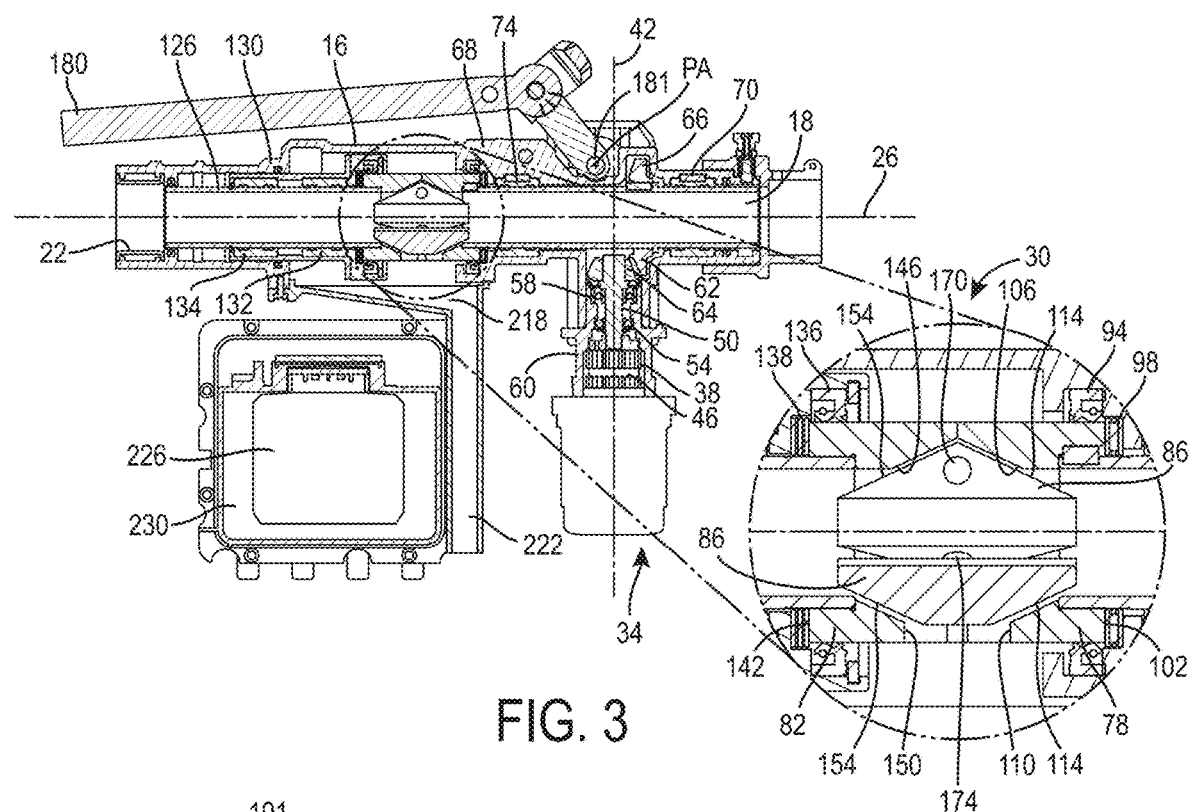
FIG. 3 is a cross-sectional view of the drain cleaning machine of FIG. 1.

As shown in FIGS. 1-3, a sectional drain cleaning machine 10 includes a frame 14, an outer housing 16 coupled to the frame 14, a rear rotation tube 18 (e.g., a snake inlet tube) defining a snake inlet, and a snake outlet tube 22 that collectively define a snake axis 26 along which a drain-cleaning snake or cable is arranged, a clamping mechanism 30, a motor 34 to rotate the clamping mechanism 30 about the snake axis 26, and a motor operation switch 36 that is switchable between a first rotational direction setting, a second (opposite) rotational direction setting, and an "off" setting. When the motor enabling switch 36 is set to the off setting, even if the motor 34 is attempted to be activated, as described in further detail below, the motor 34 is prevented from being activated. When the motor enabling switch 36 is set to either of the first or second rotational positions, the motor 34 can alternatively be activated and deactivated, as described in further detail below. In some embodiments, the motor 34 may be a variable speed motor to operate the drain cleaning machine 10 at variable speeds.

In the illustrated embodiment, the motor 34 is operatively coupled to and rotates the clamping mechanism 30 about the snake axis 26 via a transmission 38 and the rear rotation tube 18. In the illustrated embodiment, the motor 34 is vertically arranged and defines a motor axis 42 that is perpendicular to the snake axis 26. However, in other embodiments, the motor 34 is arranged such that the motor axis 42 is parallel to the snake axis 26. In still other embodiments, the motor 34 is arranged such that motor axis 42 is neither parallel nor perpendicular to the snake axis 26. As shown in FIGS. 1 and 2, the outer housing 16 includes carry loops 44 to allow an operator to attach a carabiner and strap to the drain cleaning machine 10 to carry the drain cleaning machine 10 in a hands-free manner.

The transmission 38 includes a planetary transmission portion 46 driven by the motor 34 and including two planetary stages. In other embodiments, the transmission 38 may include fewer or more planetary stages or may include other gear arrangements. The transmission 38 also includes an output shaft 50 driven by the planetary transmission portion 46 and arranged along the motor axis 42. The output shaft 50 is supported by first and second output shaft bearings 54, 58 within a gear housing 60. The transmission 38 further includes a first bevel gear 62 coupled for rotation with a pinion 64 of the output shaft 50, and a second bevel gear 66 engaged with the first bevel gear 62. The motor 34 and transmission 38 are isolated from grease and contaminants due to their arrangement below the rear rotation tube 18.

The rear rotation tube 18 is coupled for rotation with the second bevel gear 66, such that the motor 34 is configured to rotate the rear rotation tube 18 about the snake axis 26 via the transmission 38. In the illustrated embodiment, the second bevel gear 66 is coupled to the rear rotation tube 18 with a press fit. In other embodiments, the bevel gear 66 may be coupled to the rear rotation tube 18 in other ways. The rear rotation tube 18 is rotatably supported within an inner housing 68 by first and second rear bushings 70, 74. In some embodiments, the first and second rear bushings 70, 74 are oil impregnated bushings. However, in other embodiments, the first and second rear bushings 70, 74 can be needle roller, ball bearing, tapered roller, or other types of bearings.

The clamping mechanism 30 is positioned within the outer housing 16 between the rear rotation tube 18 and the snake outlet tube 22. The illustrated clamping mechanism 30 includes a first support member 78, a second support member 82, and a plurality of collets 86 supported by the first and second support members 78, 82. As explained in further detail below; each of the collets 86 is configured to move between a first, disengaged position, in which each collet 86 is moved radially away from the snake axis 26 and the snake, and a second, engaged position, in which each collet 86 is moved radially toward the snake axis 26 to a position in which it engages the snake. In the illustrated embodiment, there are three collets 86, but in other embodiments there may be more collets 86, and in still other embodiments there may be just two collets 86.

Figure 4:
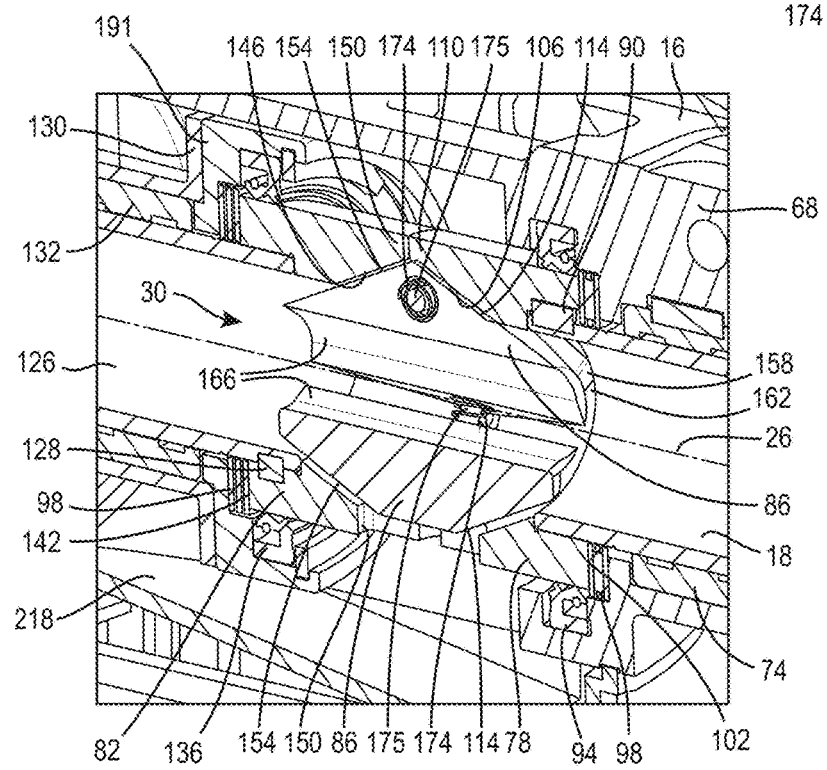
FIG. 4 is another cross-sectional view of a portion of the drain cleaning machine of FIG. 1.

The first support member 78 is coupled for rotation with the rear rotation tube 18 via a first radial coupling member 90. A first seal 94 (FIG. 3) inhibits grease and contaminants from reaching a first thrust bearing 98 arranged between a first end 102 of the first support member 78 and the inner housing 68. As shown in FIG. 4, the first support member 78 includes an inclined surface 106 tapering from a second end 110 of the first support member 78 toward the first end 102 of the first support member 78. The inclined surface 106 of the first support member 78 is engaged against a first inclined surface 114 on each of the collets 86.

Figure 5:
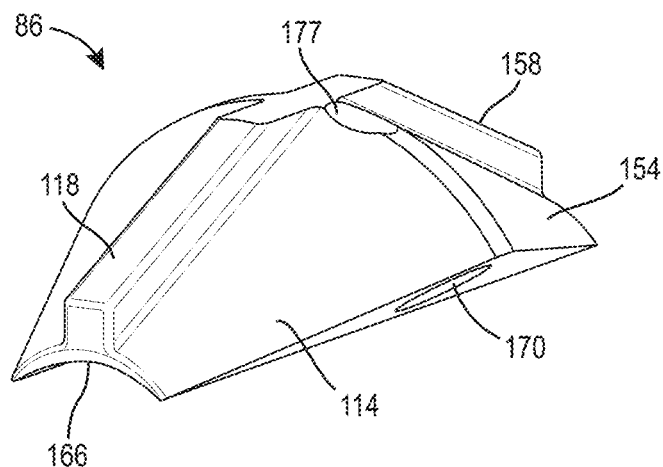
FIG. 5 is a perspective view of a collet of the drain cleaning machine of FIG. 1.
Figure 6:
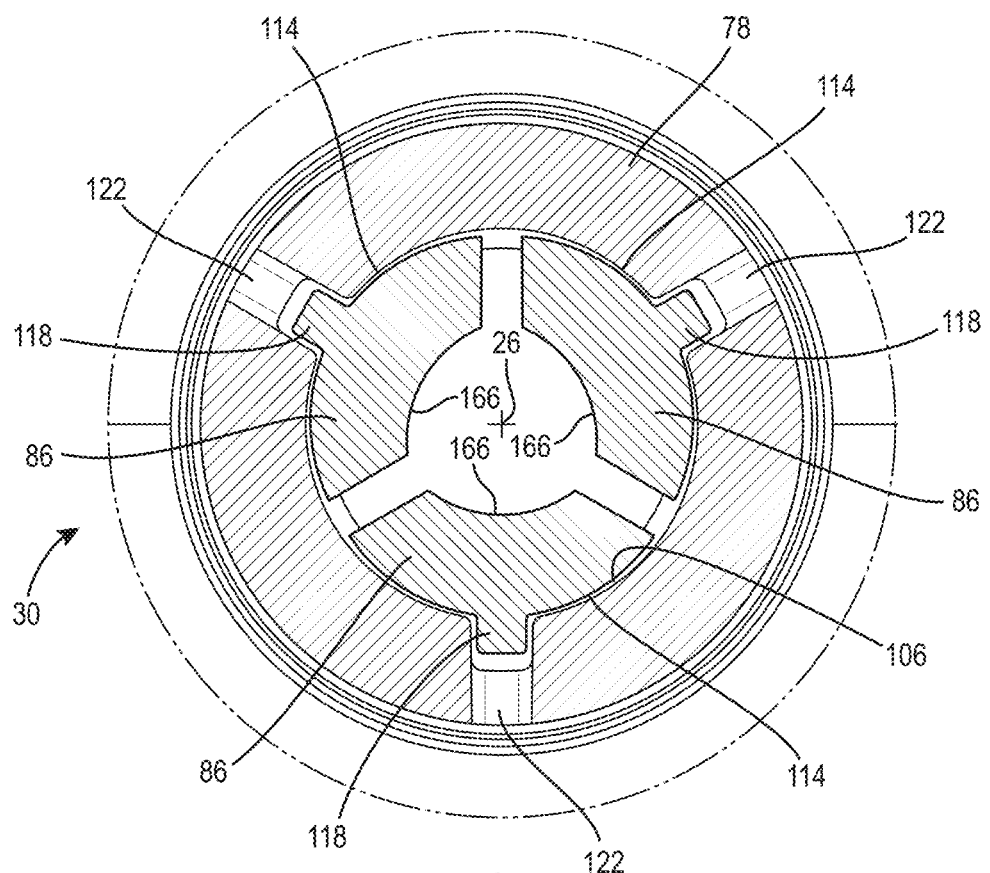
FIG. 6 is a cross-sectional view of a clamping mechanism of the drain cleaning machine of FIG. 1.
Figure 7:
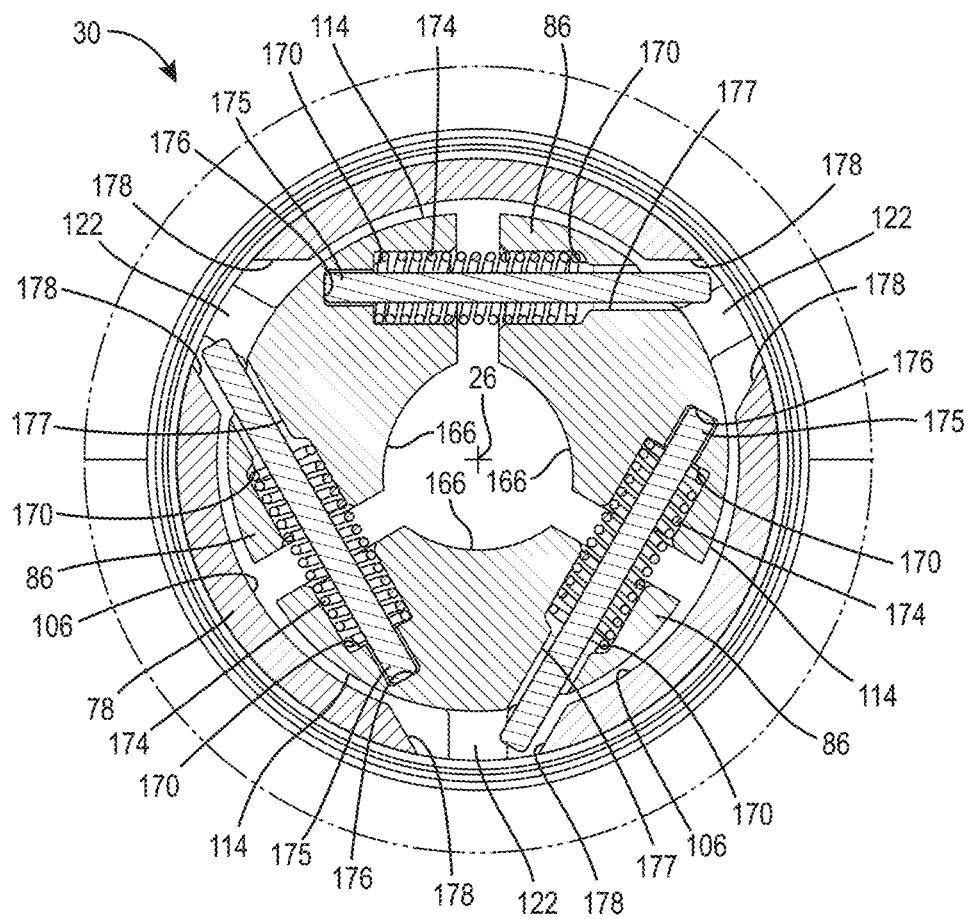
FIG. 7 is another cross-sectional view of the clamping mechanism of the drain cleaning machine of FIG. 1.

In the illustrated embodiment, the inclined surface 106 of the first support member 78 is frustoconical and the first inclined surfaces 114 on each of the collets 86 are partially frustoconical (i.e. not a complete frustocone), but in other embodiments, the inclined surfaces 106, 114 may be planar. As shown in FIGS. 5 and 6, each of the collets 86 includes a first key 118 extending radially outward from each first inclined surface 114. As shown in FIGS. 6 and 7, each first key 118 respectively extends into one of a plurality of first keyways 122 recessed into the inclined surface 106 of the first support member 78, such that each collet 86 is coupled for rotation with the first support member 78. Instead of a first key 118 and first keyway 122 arrangement, other mechanisms such as a set screw or double-D geometry could be used to lock the collets 86 for rotation with the first support member 78.

With reference again to FIG. 4, the second support member 82 is coupled for rotation and axial movement with a front tube 126 via a second radial coupling member 128. The front tube 126 is coaxial with the rear tube 18 and the snake axis 26. As shown in FIG. 3, the front tube 126 is rotatably supported within an axially movable pilot tube 130 by first and second front bushings 132, 134. In some embodiments, the first and second front bushings 132, 134 are oil impregnated bushings. However, in other embodiments, the first and second front bushings 132, 134 can be needle roller, ball bearing, tapered roller, or other types of bearings. A second seal 136 (FIG. 3) inhibits grease and contaminants from reaching a second thrust bearing 138 arranged between a first end 142 of the second support member 82 and the pilot tube 130.

As shown in FIG. 4, the second support member 78 includes an inclined surface 146 tapering from a second end 150 of the second support member 82 toward the first end 142 of the second support member 82. The inclined surface 146 of the second support member 82 is engaged against a second inclined surface 154 on each of the collets 86.

In the illustrated embodiment, the inclined surface 146 of the second support member 82 is frustoconical and the second inclined surfaces 154 on each of the collets 86 are partially frustoconical (i.e. not a complete frutocone), but in other embodiments, the inclined surfaces 146, 154 may be planar. As shown in FIGS. 4 and 5, like the first keys 118 of each collet 86, each of the collets 86 includes a second key 158 extending radially outward from each second inclined surface 154. Each second key 158 respectively extends into one of a plurality of second keyways 162 recessed into the inclined surface 146 of the second support member 82, such that second support member 82 is coupled for rotation with each of the collets 86. Instead of a second key 158 and second keyway 162 arrangement, other mechanisms such as a set screw or double-D geometry could be used to lock the collets 86 for rotation with the second support member 82.

As shown in FIGS. 4-7, each of the collets 86 includes a clamping surface 166 to engage against and clamp on the snake when the collets 86 are in their second, engaged position. In the illustrated embodiment, the clamping surface 166 is curvilinear but in other embodiments, the camping surface 166 may be planar. In some embodiments, each clamping surface may include first and second curvilinear surfaces to receive snakes of different sizes. For example, a first curvilinear surface may include a circumferential arc with a diameter that is 15 mm to receive a 15 mm drain cleaning snake. A second curvilinear surface may include a circumferential arc with a diameter that is 22 mm to receive a 22 mm drain cleaning snake. As such, the curvilinear surfaces provide full contact to a cable passing through the collets 86. As shown in FIG. 7, each of the collets 86 includes a pair of spring seats 170 recessed therein. A spring 174 is arranged between each of the collets 86 and seated on the spring seats 170, such that each collet 86 is biased away from each other collet 86 and also biased away from the snake axis 26.

Figure 8:
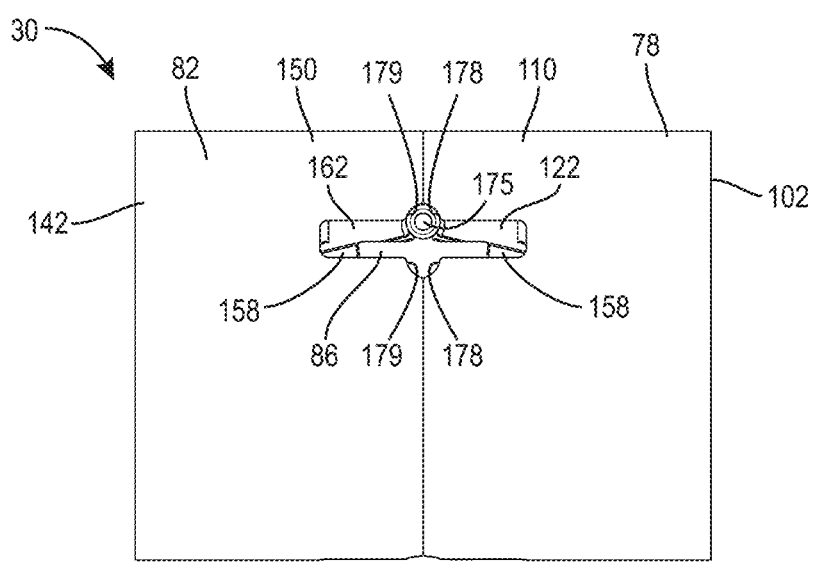
FIG. 8 is a perspective view of the clamping mechanism of the drain cleaning machine of FIG. 1.

An alignment pin 175 is also arranged between each of the collets 86, with each alignment pin 175 being arranged within one of the springs 174. Specifically, each alignment pin 175 is seated within a pin seat 176 extending through one of the spring seats 170. Each alignment pin 175 also extends through a pin bore 177 that extends through the spring seat 170 in an adjacent collet 86. As shown in FIGS. 7 and 8, when the collets 86 are all in their second, engaged positions, the alignment pins 175 extend into a curvilinear recess 178 adjacent each of the first keyways 122 and a corresponding curvilinear recess 179 adjacent each of the second keyways 162. The alignment pin 175 keep the collets 86 synchronized, such that the collets 86 move the same distance radially and axially as the collets 86 move between their first and second positions, such that there is an even clamping load on the snake when the collets 86 are in their second positions.

Figure 9:
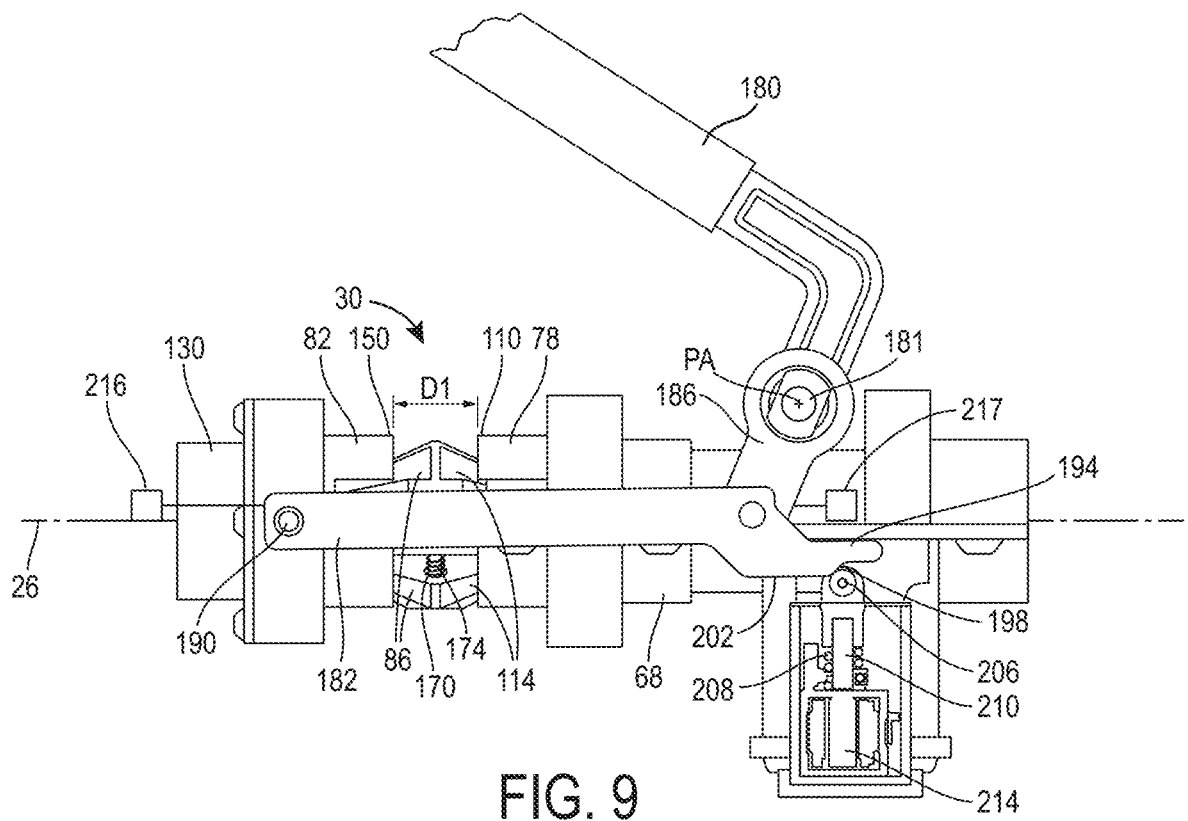
FIG. 9 is a plan view of a portion of the drain cleaning machine of FIG. 1, with portions removed and an actuating lever in a deactivated position and a second support member in a first position.
Figure 10:
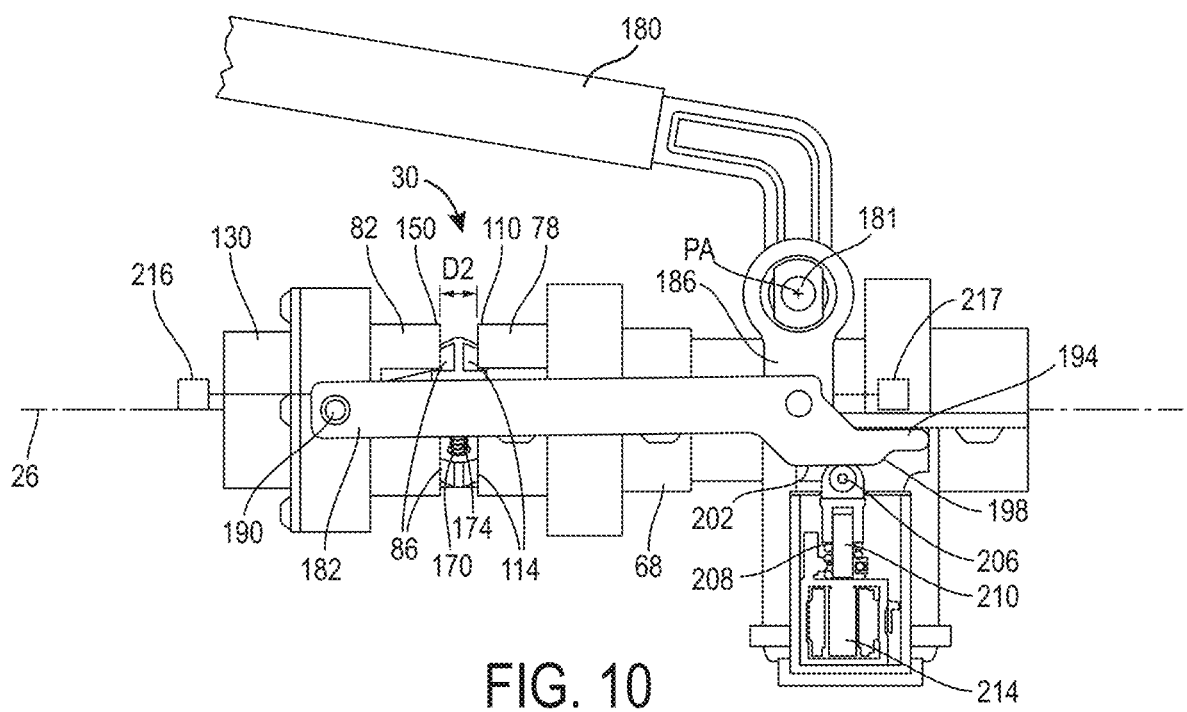
FIG. 10 is another plan view of a portion of the drain cleaning machine of FIG. 1, with portions removed and the actuating lever in an activated position and the second support member in a second position.

As shown in FIGS. 1-3, 9 and 10, the drain cleaning machine 10 includes an actuating lever 180 pivotable about a pivot point 181 defining a pivot axis PA between a first, deactivated position (FIG. 9) and a second, activated position (FIGS. 1-3 and 10). As shown in FIGS. 9 and 10, the actuating lever 180 is coupled to a pair of pull rods 182 on opposite sides of the inner housing 68 via a pair of connecting arms 186, though only one of the pull rods 182 and connecting arms 186 is shown in FIGS. 9 and 10. Each of the pull rods 182 includes a first end 190 coupled to the pilot tube 130 through a push plate 191 (FIG. 4) on opposite sides of the pilot tube 130. In the illustrated embodiment, the push plate 191 is coupled to the pilot tube 130 with four fasteners (not shown). In other embodiments, the pilot tube 130 can be directly coupled to the first ends 190 of the pull rods 182. One of the pull rods 182, and more specifically, the pull rod 182 shown in FIGS. 9 and 10, includes a second end 194 defining a cam having a first variable cam surface 198 adjacent a second cam surface 202 that is vertically lower than the first cam surface 198.

As shown in FIG. 9, when the actuating lever 180 is in the deactivated position (FIG. 9), the pull rods 182 are in a first position such that the second support member 82 is in a first position, in which there is a first distance D1 between the second support member 82 and the first support member 78. In the deactivated position of the actuating lever 180, a cam follower (i.e., a roller 206) is in a first position in which the roller 206 is engaged against the first cam surface 198 of the pull rod 182 shown in FIG. 9. The roller 206 is biased upwardly toward the pull rod 182 by a spring 208 and is coupled to a switch actuator 210 that is configured to activate a switch 214 to start the motor 34. Specifically, when the actuating lever 180 is moved to the activated position (FIGS. 1-3 and 10), the pull rods 182 are in a second position in which the second support member 82 is moved toward the first support member 78 such that the second support member 82 is in a second position. In this second position of the second support member 82, there is a second distance D2 that is less than the first distance D1 between the second support member 82 and the first support member 78. Because the pivot point 181 and pivot axis PA are both vertically above the snake axis 26, downward movement of the actuating lever 180 from the deactivated position to the activated position causes the pull rods 182 to be moved rearward from the first position to the second position.

In some embodiments, the pull rods 182 are biased toward the first position by extension springs 216, shown schematically in FIGS. 9 and 10, that are coupled to an inner front portion of the outer housing 16, such that the actuating lever 180 is also biased to the deactivated position. In some embodiment, the pull rods 182 are biased toward the first position by compression springs 217, shown schematically in FIGS. 9 and 10, that are coupled to an inner rear portion outer housing 16, such that the actuating lever 180 is also biased to the deactivated position.

Figure 15:
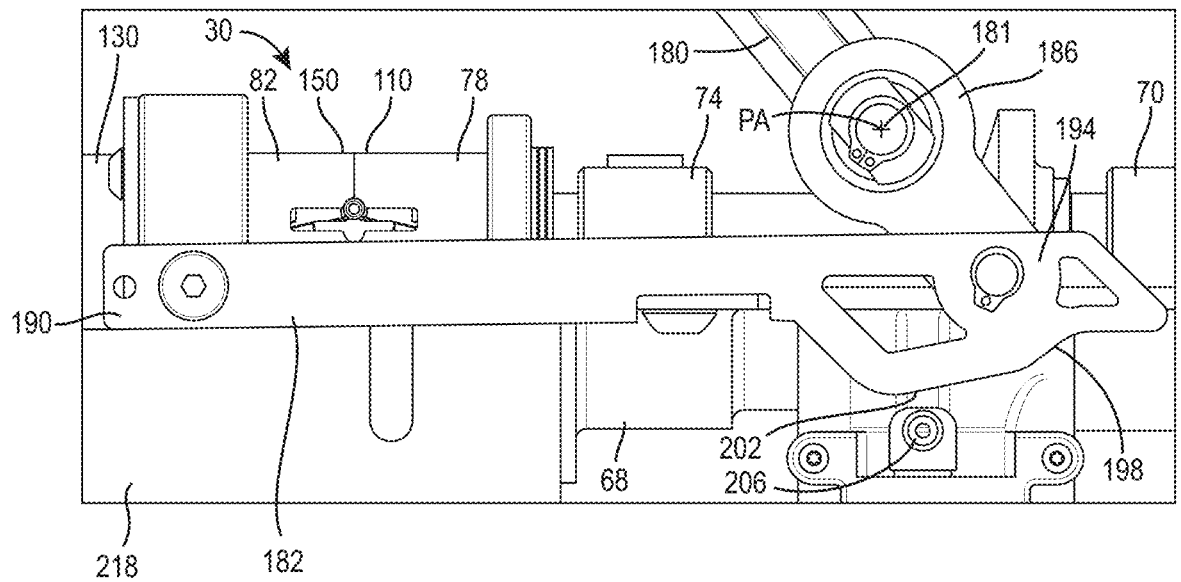
FIG. 15 is a plan view of a portion of the drain cleaning machine of FIG. 1, with portions removed and an actuating lever in an activated position and a second support member in a second position, according to another embodiment of the invention.

In some embodiments, in the second position of the second support member 82, the second end 150 of the second support member 82 is in contact with the second end 110 of the first support member 78, such that there is no distance between them, and thus D2 is equal to zero, as shown in FIGS. 8 and 15. Also, when the actuating lever 180 is moved to the activated position (FIGS. 1-3 and 10), the roller 206 is rolled along the first cam surface 198 until the roller 206 is below the second cam surface 202, as shown in FIG. 10. As the roller 206 is translated vertically downwards by the second cam surface 202, the switch actuator 210 is pushed downwards to activate the switch 214 and thus the motor 34, assuming the motor enabling switch 36 is in one of the first or second rotational settings.

With reference to FIGS. 1-3, the drain cleaning machine 10 also includes a contaminant well 218 arranged below the clamping mechanism 30 and a drain tube 222 extending from the contaminant well 218. The contaminant well 218 is configured to capture grease and contaminants dropped off the snake or spun off the snake during operation of the drain cleaning machine 10, and the drain tube 222 is configured to drain the contaminants from the well 218 to a secure source where the grease and contaminants can be disposed of. The grease and contaminants are only able to enter the contaminant well 218 through the gap between the first and second support member 78, 82, as the pilot tube 130 inhibits ingress or egress of grease and contaminants between the front tube 126 and the contaminant well 218.

The drain cleaning machine 10 is a DC battery powered drain cleaning machine in which the motor 34 is powered by a battery or battery pack 226 arranged in a battery compartment 230 (FIG. 3). In the illustrated embodiment, the battery compartment 230 is sealed by a door 234 (FIG. 1). The door 234 seals and isolates the battery compartment 230 and battery pack 226 from the contaminated environment, thereby keeping the battery pack 226 clean and dry. In some embodiments, in addition to being powered by the battery 226, the drain cleaning machine 10 and the motor 34 can also be powered by AC power. In alternative embodiments, the drain cleaning machine 10 and motor 34 can only be powered by AC power.

When an operator desires to clean a drain or pipe, the operator ensures that the motor enabling switch 36 is set to the first or second rotational settings and then passes the snake through the rear rotation tube 18 until the snake extends out of the snake outlet tube 22 and is sufficiently extended into the drain. Once the operator has fed a complete or sufficient length of the snake into the drain, the operator may wish to spin the snake in order to, for example, break up clogs within the drain. In order to spin the snake, the operator moves the actuating lever 180 from the deactivated position to the activated position, which causes the pilot tube 130 to be pulled by the pull rods 182 toward the first support member 78.

As the pilot tube 130 moves toward the first support member 78, the second support member 82 is moved by the pilot tube 130 from the first position to the second position, therefore also causing the front tube 126 to move axially with the second support member 82 along the snake axis 26. As the second support member 82 moves from the first position to the second position and the distance decreases between the first and second support members 78, 82, the first inclined surfaces 114 and second inclined surfaces 154 of the collets 86 are forced to slide along the inclined surfaces 106, 146 of the first and second support members 78, 82. The collets 86 are thus forced to move radially inward against the biasing force of the springs 174, from their first, disengaged position to their second, engaged position in which the clamping surfaces 166 of the collets 86 clamp down on the snake.

Movement of the actuating lever 180 to the activated position also causes the pull rods 182 to translate right as viewed in FIGS. 9 and 10, such that the roller 206 rolls along the first cam surface 198 until the roller 206 is below the second cam surface 202, as shown in FIG. 10. As the roller 206 is translated vertically downwards against the biasing force of spring 208, the switch actuator 210 is pushed downwards to activate the switch 214 and thus the motor 34. Rotation of the motor 34 causes rotation of the rear rotation tube 18 via the transmission 38, and rotation of the rear rotation tube 18 causes rotation of the first support member 78, thus causing the collets 86, the second support member 82, and the front tube 126 to all rotate about the snake axis 26 relative to the inner housing 68 and the pilot tube 130. Because the collets 86 are clamped on the snake, the snake is caused to rotate with the collets 86 and cleans out debris and clogs in the drain. Because the clamping mechanism 30 transforms a pulling force applied by the operator to the actuating lever 180 into a clamping force of the collets 86, the operator gains a significant mechanical advantage with respect to the clamping force applied to the snake, which allows the snake to have a high output torque to clear clogs within the drain.

When the operator is satisfied with the cleaning operation, the operator moves the actuating lever 180 from the second, activated position back to the first, deactivated position. Movement of the actuating lever 180 from the second, activated position to the first, deactivated position causes the pull rod 182 to translate left (as viewed in FIGS. 9 and 10) until the first cam surface 198 is arranged above the roller 206. Thus, the spring 208 biases the roller 206 upwardly until the roller 206 rolls back onto the first cam surface 198. The switch actuator 210 is moved to a position in which the switch actuator 210 no longer activates the switch 214, and thus the motor 34 is deactivated. Movement of the actuating lever 180 from the second, activated position to the first, deactivated position also causes the pilot tube 130 to be pushed by the pull rods 182 away the first support member 78.

As the pilot tube 130 moves away from the first support member 78, the springs 174 between the collets 86 force the collets 86 radially outward from their second, engaged position, to their first, disengaged positions where the collets 86 are no longer engaged on the snake. As the springs 174 push the collets 86 radially outward, the second inclined surfaces 154 of the collets push the second support member 82 away from the first support member 78 until the second support member 82 is in the first position, therefore also causing the front tube 126 to move axially with the second support member 82. Thus, the operator is then able to remove the snake from the drain cleaning machine 10.

Figure 11:
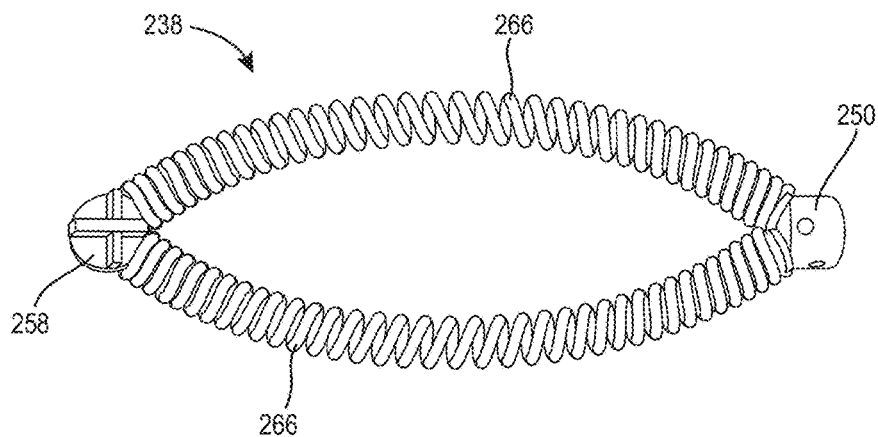
FIG. 11 is a perspective view of a cleaning head for use with a snake that is rotatable by the drain cleaning machine of FIG. 1.
Figure 12:
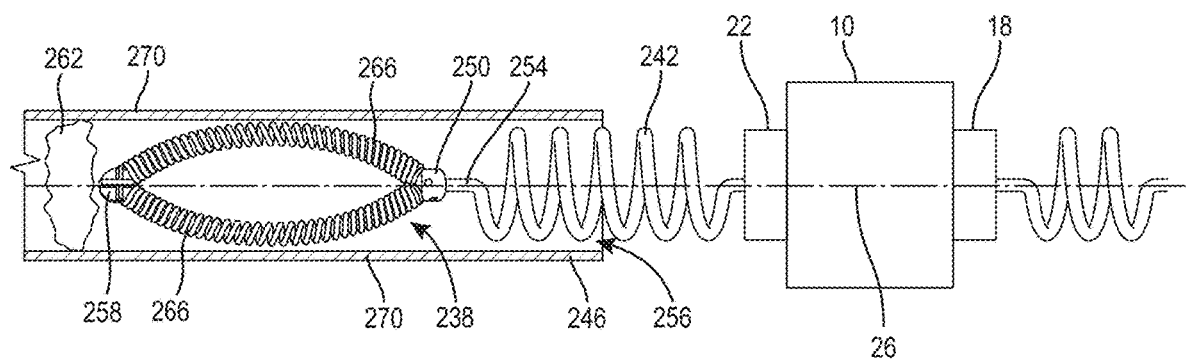
FIG. 12 is a schematic view of the cleaning head of FIG. 10 within a drain and coupled to a snake that is rotatable by the cleaning machine of FIG. 1.

FIGS. 11 and 12 illustrate a cleaning head 238 configured to be coupled to a snake 242 to assist in cleaning a drain 246 during a drain cleaning operation. The cleaning head 238 may also be referred to as a spring head. In the illustrated embodiment, the cleaning head 238 is removably attachable to the snake 242, but in other embodiments, the cleaning head 238 may be a permanent fixture of the snake 242. The cleaning head 238 includes a coupling end 250) that couples to a front end 254 of the snake 242 that first enters an opening 256 of the drain 246, such that the cleaning head 238 is coupled for rotation with the snake 242. The cleaning head 238 also includes a tip end 258 configured to bore through a clog 262 in the drain 246. The cleaning head 238 further includes a plurality of springs 266 arranged between the coupling end 250 and the tip end 258. Each spring 266 may be, for example, a coiled compression spring. The springs 266 are biased away from the snake axis 26. As such, in a neutral state, each spring 266 is curved (e.g., bowed) away from the other spring 266. In the illustrated embodiment, the cleaning head 238 includes two springs 266. The springs 266 are spaced 180 degrees apart. In other embodiments, the cleaning head 238 may include a single spring or more than two springs. For example, the cleaning head 238 may include three springs spaced 120 degrees apart, four springs spaced 90 degrees apart, etc. In still other embodiments, instead of springs 266, a sheet of spring steel could be used.

In operation and with reference to FIG. 12, the coupling end 250 of the cleaning head 238 is coupled to the front end 254 of the snake 242, proximate the opening 256 of the drain 246. The springs 266 are pushed toward the snake axis 26 and the cleaning head 238 is then inserted into the drain 246. Once the cleaning head 238 is inside the drain 246, the springs 266 are allowed to rebound away from the snake axis 26 and into contact with inner walls 270 of the drain 246. The snake 242 is then rotated by the drain cleaning machine 10 about the snake axis 26, as described above. As the snake 242 rotates, the cleaning head 238 rotates with the snake 242 about the snake axis 26, causing the springs 266 to scrape against the inner walls 270 of the drain 246 and the tip end 258 to bore through the clog 262 in the drain 246.

The cleaning head 238 provides an advantage over using the snake 242 alone to clean the drain 246, because the springs 266 of the cleaning head 238, due to their resilient nature, are forced to be in contact with the inner walls 270 of the drain 246. While FIG. 12 illustrates the drain-cleaning machine 10 being used to rotate the snake 242 and cleaning head 238 about the snake axis 26, the cleaning head 238 could be used with any drain cleaning machine configured to rotate a snake or cable.

Figure 13:
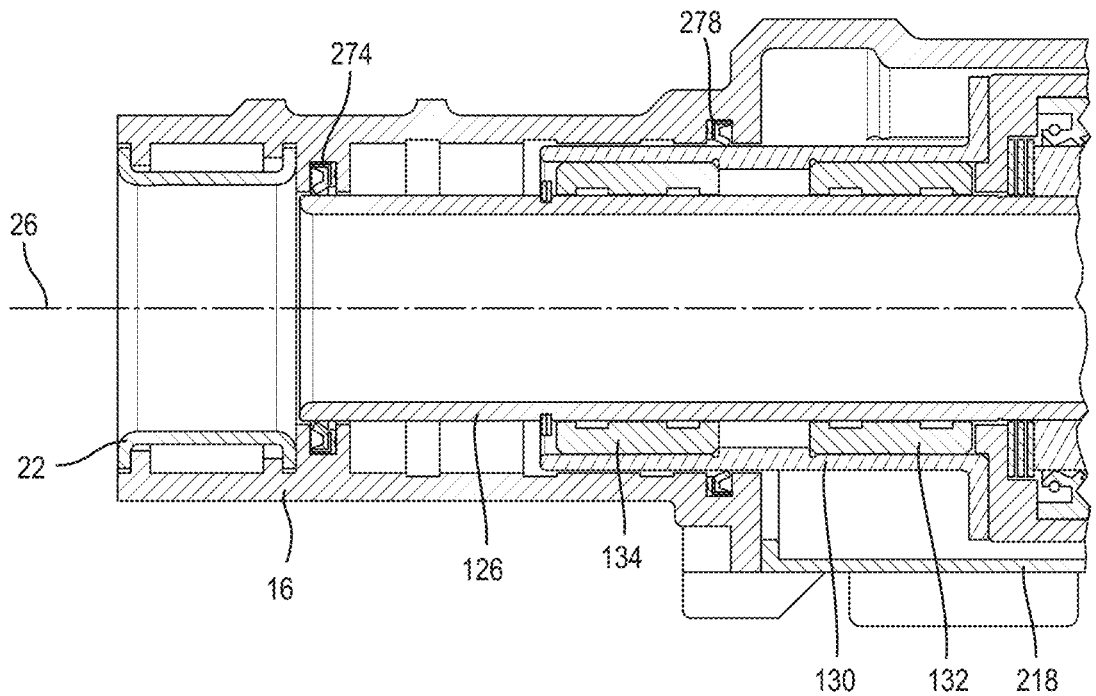
FIG. 13 is an enlarged, cross-sectional view of a portion of the drain cleaning machine of FIG. 1.

As shown in FIG. 13, a first front seal 274 is arranged between the outer housing 16 and the front tube 126, such that grease and contaminants are inhibited from moving from the snake exit tube 22 to an area between the front tube 126 and the pilot tube 130, thereby inhibiting contamination of the first and second front bushings 132, 134. Similarly, a second front seal 278 is arranged between the outer housing 16 and the pilot tube 130, such that grease and contaminants are inhibited from moving from the contaminant well 218 to an area between the front tube 126 and the pilot tube 130, thereby inhibiting contamination of the first and second bushings 132, 134. As also shown in FIG. 13, the snake outlet tube 22 is a wear tube formed of hardened steel that receives the abrasive contact of the snake as the snake rotates and moves along the snake axis 26, in order to inhibit the snake from contacting or damaging the outer housing 16, which is formed of aluminum.

Figure 14:
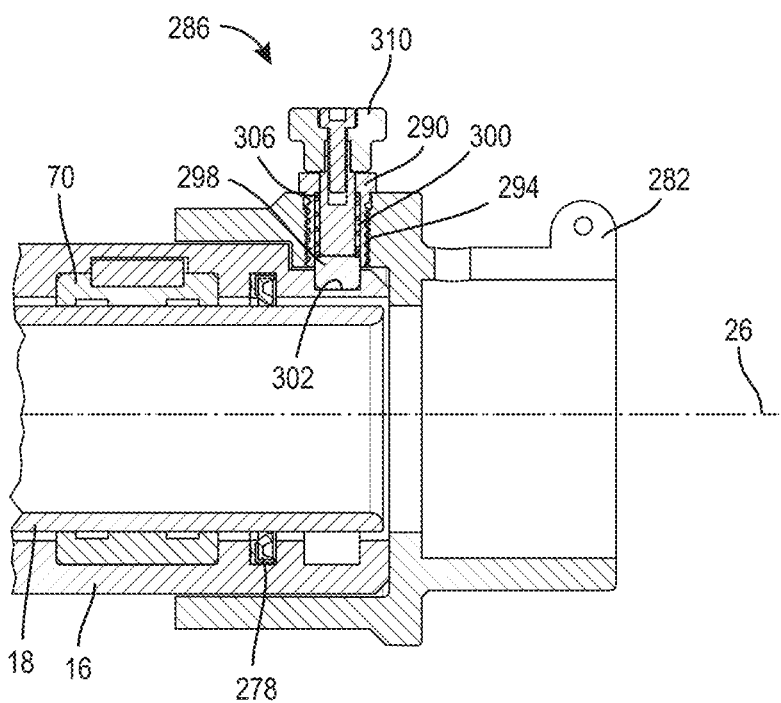
FIG. 14 is an enlarged, cross-sectional view of a portion of the drain cleaning machine of FIG. 1.

As shown in FIG. 14, a rear seal 278 is arranged between the outer housing 16 and the rear rotation tube 18, such that grease and contaminants are inhibited from moving from the rear rotation tube 18 to an area between the rear rotation tube 18 and the outer housing 16, thereby inhibiting contamination of the first rear bushing 70. As also shown in FIG. 14, a snake entrance coupling 282 is coupled to the outer housing 16 via a quick-connect assembly 286. Specifically, the quick-connect assembly 286 includes a threaded fastener 290 threaded into a bore 294 of the snake entrance coupling 282. A plunger 298 is arranged within a bore 300 in the fastener 290, moveable with respect to the fastener 290, and biased into a bore 302 in the outer housing 16 by a compression spring 306 that is also arranged in the bore 300 of the fastener 290. When the operator desires to quickly remove the snake entrance coupling 282 from the outer housing 16, the operator simply pulls upward on a graspable knob 310 that is coupled to the plunger 298, thereby pulling the plunger 298 upward, against the biasing force of spring 306 and out of the bore 302 of the outer housing 16. The operator may then axially slide the snake entrance coupling 282 off the outer housing 16.

FIG. 15 illustrates another embodiment of the pull rods 182, connecting arms 186, first cam surface 198, and second cam surface 202.

Figure 16:
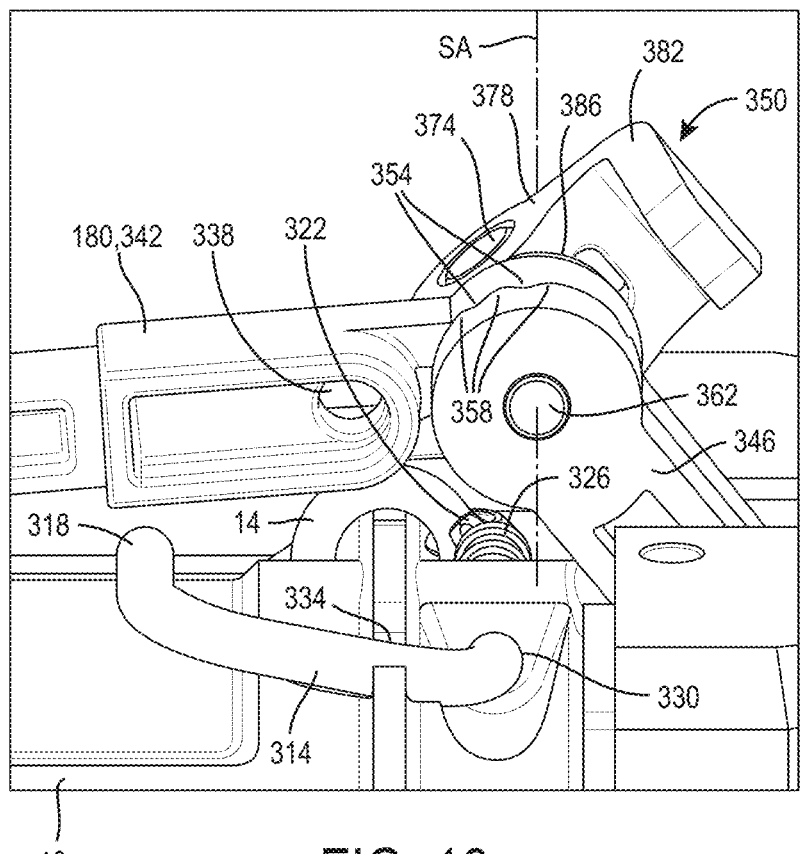
FIG. 16 is an enlarged perspective view of the clamping assembly of the drain cleaning machine of FIG. 15.

As shown in FIG. 16, a locking member 314 is coupled to the outer housing 16 and is used to lock the actuating lever 180 in a carry position, in which the actuating lever 180 is horizontal or nearly horizontal. In some embodiments, the carry position of the actuating lever 180 may be identical to the second, activated position of the actuating lever 180, or very close thereto. In the illustrated embodiment, the locking member 314 is a spring-loaded U-Loop. Specifically, the locking member 314 includes a locking end 318 and an opposite biased end 322 that is biased in a direction parallel to the pivot axis PA away from the outer housing 16 by a compression spring 326. The locking member 314 is arranged through a bore 330 in the outer housing 16, which thereby allows the locking member 314 to pivot between a first position, in which the locking member 314 is caught by a recess 334 of the outer housing 16, and a second position, in which the locking member 314 is moved out of the recess 334.

When the operator desires to move the actuating lever 180 to the carry position, the operator first sets the motor enabling switch 36 to the "off" position, then moves the actuating lever 180 to the carry position. Thus, even though the roller 206 is translated vertically downwards by the second cam surface 202 and the switch actuator 210 is pushed downwards to activate the switch 214, because the motor enabling switch 36 is in the "off" positon, the motor 34 is not activated, which makes the drain cleaning machine 10 safer to carry. Then, when the locking member 314 is pivoted out of the recess 334 to the second position, the compression spring 326 biases the biased end 322 even further from the outer housing 16 than in the first position of the locking member 314, such that the locking end 318 is received in a bore 338 of the actuating lever 180, thereby inhibiting the actuating lever 180 from moving away from the outer housing 16. Now, the operator is free to grasp the operating lever 180 to carry the drain cleaning machine 10 at a worksite.

When the operator is done transporting the drain cleaning machine 10 and desires to use the drain cleaning machine 10 again, the operator first pulls the locking end 318 out of the bore 338 of the actuating lever 180, against the biasing force exerted on the biased end 322 by the compression spring 326, then rotates the locking member 314 back into the first position, where the locking member 314 is caught in the recess 334. The actuating lever 180 is then moved from the carrying position back to the first, deactivated position. Subsequently, the operator switches the motor enabling switch 36 back to the first or second rotational settings. The operator is now able to operate the drain cleaning machine 10 as described above.

Figure 17:
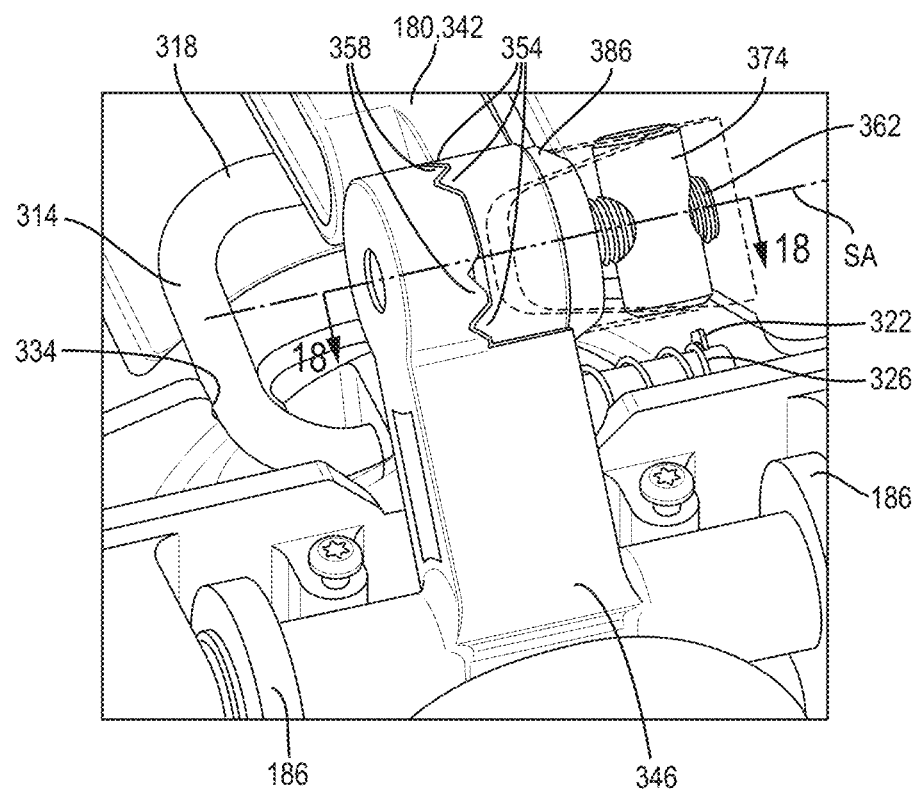
FIG. 17 is an enlarged perspective view of the clamping assembly of FIG. 16, with a clamping handle removed.
Figure 18:
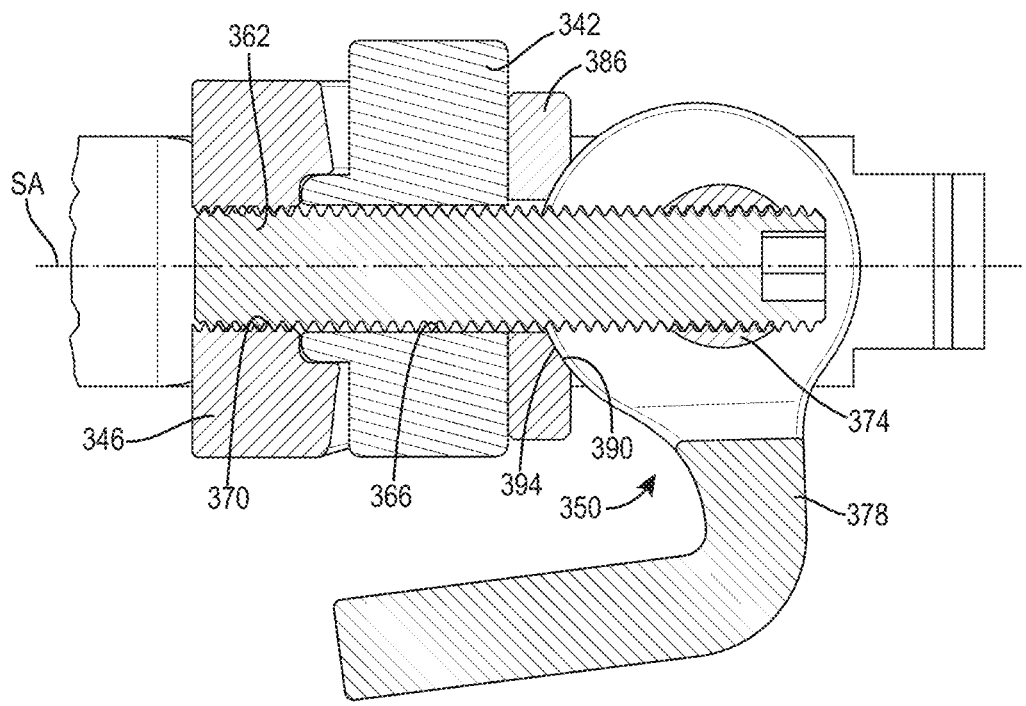
FIG. 18 is a cross-sectional view of the clamping assembly of FIG. 16.

As shown in FIGS. 16-18, the actuating lever 180 includes a handle part 342 and a linkage part 346 coupled to the handle part 342 via a clamping assembly 350. The linkage part 346 is coupled to the connecting arms 186, such that the connecting arms 186 rotate with the linkage part 346 about the pivot axis PA. The handle part 342 includes a first plurality of splines 354 and the linkage part 346 includes a second set of splines 358 configured to engage with the first splines 354 in a plurality of rotational positions, as explained in further detail below.

With reference to FIG. 18, the clamping assembly 350) includes a threaded cam rod 362 that extends through an unthreaded bore 366 in the handle part 342 and is threaded into a threaded bore 370 in the linkage part 346. In some embodiments, the threaded cam rod 362 and/or the bore 370 may not be threaded. For example, the bore 370 may be a straight (i.e., unthreaded) hole, and a shoulder bolt or other fastener may pass through the bore 370 to connect to the cam rod 362. The threaded cam rod 362 defines a shaft axis SA.

A cylindrical member 374 is coupled to the threaded cam rod 362, such that rotation of the cylinder member 374 causes the threaded cam rod 362 to thread or unthread into the threaded bore 370 of the linkage part 346. A clamp handle 378 is coupled to the cylindrical member 374 and is rotatable with respect thereto. The clamp handle 378 includes a graspable lip 382. A clamp member 386 is arranged between the clamp handle 378 and the handle part 342 is co-rotatable with the clamp handle 378 due to mating cam surfaces 390, 394 (FIG. 18) on the clamp member 386 and clamp handle 378, respectively.

In operation, the rotational position of the handle part 342 can be adjusted with respect to the linkage part 346 in the following manner. Such adjustment allows the drain cleaning machine 10 to operate with different sizes (e.g., diameters) of drain snakes, such as a ⅝ inch diameter snake and a ⅞ inch diameter snake. In the position shown in FIG. 18, the clamp assembly 350 provides compression to the handle part 342 to maintain the handle in a locked position. First, the operator grasps the lip 382 of the clamp handle 378 and rotates it from a first position shown in FIGS. 1, 2 and 16, to a second position, in which the lip 382 is roughly perpendicular to the shaft axis SA. Next, while continuing to hold the lip 382, the operator rotates the clamp handle 378 about the shaft axis SA, thus causing the clamp member 386, the cylindrical member 374 and threaded shaft 362 to rotate as well, thereby causing the threaded cam rod 362 to begin unthreading from the threaded bore 370 of the linkage part 346. As the threaded cam rod 362 unthreads from the threaded bore 370, the clamp handle 378 moves away from the handle part 342 until there is no more compression between the handle part 342 and the clamp assembly 350. The clamp handle part 342 can then be rotated until there is a sufficient distance that the clamp member 374 and the handle part 342 can both be pulled away from the linkage part 346.

Once the handle part 342 is pulled away from the linkage part 346, the handle part 342 can be rotated with respect to the linkage part 346 about the shaft axis SA. If the operator is using a large-diameter snake with the drain cleaning machine 10, the operator will elect to rotate the handle part 342 toward the outer housing 16 with respect to the linkage part 346. Subsequently, the operator will rotate the handle part 342 to thread the threaded shaft 362 into the threaded bore 370 of the linkage part 346, causing the clamp member 374 to force the handle part 342 against the linkage part 346 and the first set of splines 354 to reengage with the second set of splines 358, locking the linkage part 346 for pivoting movement with respect to the handle part 342, except in this new position of the handle part 342, the deactivated position of the actuating lever 180 is now closer to the outer housing 16.

In the above example, because the operator is using a relatively large-diameter snake with the drain cleaning machine 10, the operator needs less pivotal motion of the actuating lever 180 about the pivot axis PA to move the actuating lever 180 into the activated position, because the collets 86 clamp on the large-diameter snake sooner than if a relatively small-diameter snake were being used. Because the operator has been able to rotationally adjust the handle part 342 with respect to the linkage part 346, this reduced pivotal motion takes place closer to the outer housing 16. In contrast, if the handle part 342 were not able to be rotationally adjusted with respect to the linkage part 346, or if the actuating lever 180 was formed as a single unitary member, the activated position of actuating lever 180 could be nearly vertical when the collets 86 engaged a large-diameter snake.

Figure 19:
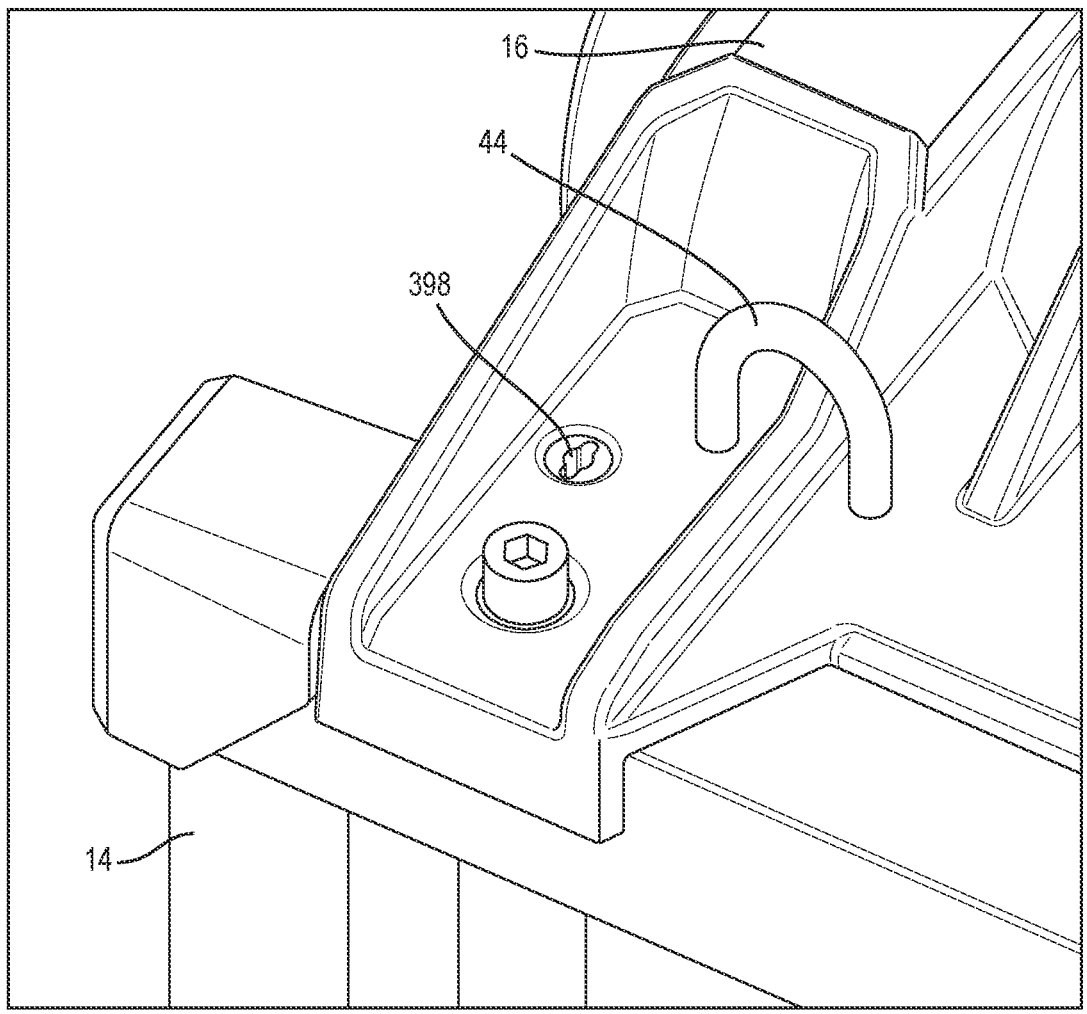
FIG. 19 illustrates a portion of the drain cleaning machine of FIG. 1, illustrating a grommet for holding a pin key.

In some embodiments, as shown in FIG. 19, the drain cleaning machine 10 may include a rubber grommet 398 disposed within a recess. The recess may be positioned on the frame 14, the outer housing 16, or the inner housing 68. The grommet 398 is configured to receive a pin key that may be used to separate adjacent drain cleaning snakes. The pin key may be removed from the grommet 398 and inserted into a drain cleaning snake coupling to release one drain cleaning snake from another drain cleaning snake. A user may then place the pin key back in the grommet 398 for storage until the pin key is needed again. Various features and advantages are set forth in the following claims.

What is claimed is:

1. A drain cleaning machine comprising:
   a snake inlet tube defining a snake axis;
   a clamping mechanism including
      a first support member supported by the snake inlet tube, the first support member having an inclined surface,
      a second support member having an inclined surface, the second support member movable along the snake axis between a first position in which a first distance is defined between the first support member and the second support member, and a second position in which a second distance is defined between the first support member and the second support member, wherein the second distance is less than the first distance, and
      a plurality of collets supported by the first and second support members, each of the plurality of collets having a first inclined surface engaged against the inclined surface of the first support member and a second inclined surface engaged against the inclined surface of the second support member, wherein when the second support member is in the first position, each collet is in a disengaged position, and wherein in response to the second support member moving from the first position to the second position, each of the collets is moved from the disengaged position to an engaged position, in which each collet is closer to the snake axis than when in the disengaged position;
   a motor switchable between a deactivated state and an activated state in which the motor is configured to rotate the clamping mechanism about the snake axis;
   an actuating lever supported by the snake inlet tube and operable to move the second support member from the first position to the second position, the actuating lever moveable between a deactivated position, in which the second support member is moved to the first position, and an activated position, in which the second support member is moved to the second position.

2. The drain cleaning machine of claim 1, wherein the motor is deactivated when the actuating lever is in the deactivated position, and wherein the motor is activated when the actuating lever is in the activated position.

3. The drain cleaning machine of claim 1, further comprising a spring arranged between each pair of adjacent collets, each of the springs respectively biasing the plurality collets toward the disengaged positions.

4. The drain cleaning machine of claim 1, wherein the plurality of collets includes three collets.

5. The drain cleaning machine of claim 1, wherein the inclined surfaces of the first and second support members are frustoconical.

6. The drain cleaning machine of claim 5, wherein the first and second inclined surfaces of each collet are partially frustoconical.

7. The drain cleaning machine of claim 1, further comprising a front tube coaxial with the snake axis, the front tube defining a snake outlet.

8. The drain cleaning machine of claim 7, wherein the snake inlet tube supports the first support member and the front tube supports the second support member.

9. The drain cleaning machine of claim 8, wherein the front tube is coupled to the actuating lever through a pull rod, and wherein as the actuating lever moves from the deactivated position to the activated position, the pull rod moves the front tube towards the snake inlet tube.

10. The drain cleaning machine of claim 7, further comprising a snake outlet tube adjacent the snake outlet, wherein the snake outlet tube is formed of hardened steel.

11. The drain cleaning machine of claim 1, wherein each collet includes a curvilinear clamping surface configured to clamp a snake when in the engaged position.

12. The drain cleaning machine of claim 1, further comprising a snake partially received within the snake inlet tube and a cleaning head coupled to the snake, the cleaning head including a plurality of springs biased and curved away from the snake axis.

13. The drain cleaning machine of claim 1, wherein the actuating lever is lockable in a carry position.

14. The drain cleaning machine of claim 13, further comprising a U-shaped locking member having an end received in a bore of the actuating lever to inhibit movement of the actuating lever when in the carry position.

15. The drain cleaning machine of claim 1, further comprising one or more carry loops.

16. The drain cleaning machine of claim 1, further comprising grommet configured to receive a pin key that is used to separate adjacent drain cleaning snakes.

17. A drain cleaning machine comprising:
a motor defining a motor axis;
a snake inlet tube defining a snake axis, the snake inlet tube configured to rotate about the snake axis;
a snake outlet tube coaxial with the snake axis, the snake outlet tube defining a snake outlet;
an actuating lever supported by the snake inlet tube, the actuating lever operable to move the snake outlet tube relative to the snake inlet tube and to selectively activate the motor; and
a transmission to transfer rotation from the motor to the snake inlet tube, the transmission including,
an output shaft extending from the motor, the output shaft rotatably driven by the motor,
a first gear coupled to the output shaft for co-rotation therewith, and
a second gear coupled to the snake inlet tube for co-rotation therewith, the second gear engaged with the first gear to receive rotation from the first gear;
wherein the motor axis is perpendicular to the snake axis.

18. The drain cleaning machine of claim 17, further comprising a clamping mechanism supported by the snake inlet tube, the clamping mechanism configured to engage a drain cleaning snake to transfer rotation to the drain cleaning snake.

19. The drain cleaning machine of claim 17, wherein the first gear is a first bevel gear and the second gear is a second bevel gear.

20. The drain cleaning machine of claim 17, wherein the transmission further includes a planetary transmission portion.

21. The drain cleaning machine of claim 17, wherein the second gear is secured to the snake inlet tube.

22. The drain cleaning machine of claim 17, wherein the motor and the transmission are positioned beneath the snake inlet tube along the motor axis.

23. A drain cleaning machine comprising:
a first tube defining a snake axis;
a second tube coaxial with the first tube;
a clamping mechanism supported by the first and second tubes, the clamping mechanism configured to selectively engage a drain cleaning snake extending through the first and second tubes;
a motor operable to selectively rotate the clamping mechanism about the snake axis;
a switch coupled to the motor and operable to change the motor between a deactivated state and an activated state;
a cam follower moveable between a deactivated position, in which the motor is not activated by the switch, and an activated position, in which the motor is activated by the switch;
an actuating lever moveable between a first position, in which the clamping mechanism does not engage the drain cleaning snake, and a second position, in which the clamping mechanism engages the drain cleaning snake; and
a pull rod including a first end coupled to the second tube and a second end coupled to the actuating lever, the second end defining a cam;
wherein in response to the actuating lever moving from the first position to the second position, the cam engages the cam follower to move the cam follower from the deactivated position to the activated position.

24. The drain cleaning machine of claim 23, wherein the cam follower is biased to the deactivated position.

25. The drain cleaning machine of claim 23, wherein the cam includes a first cam surface and a second cam surface that is offset from the first cam surface.

26. The drain cleaning machine of claim 25, wherein the cam follower contacts the first cam surface when in the deactivated position and contacts the second cam surface when in the activated position.

27. The drain cleaning machine of claim 23, wherein the cam follower includes a roller.

28. The drain cleaning machine of claim 23, wherein the pull rod is a first pull rod and the drain cleaning machine further comprises a second pull rod on a diametrically opposite side of the first and second tubes from the first pull rod.

\* \* \* \* \*